United States Patent [19]
Schulz et al.

[11] Patent Number: 4,459,072
[45] Date of Patent: Jul. 10, 1984

[54] DEVICE FOR THE LOCKING CONTAINER ON VEHICLES

[76] Inventors: Gerd Schulz, Besselstrasse 9; Hans-Peter Hartleif, Rotbergskamp 20 C, both of 2100 Hamburg 90, Fed. Rep. of Germany

[21] Appl. No.: 230,858

[22] Filed: Feb. 2, 1981

[30] Foreign Application Priority Data

Jul. 9, 1980 [DE] Fed. Rep. of Germany ....... 3025976

[51] Int. Cl.³ .............................................. B65J 1/22
[52] U.S. Cl. ..................................... 410/82; 292/218; 292/210
[58] Field of Search .................... 410/83, 82; 292/359, 292/207, 210, 153, 150, 106, 108, 218

[56] References Cited

U.S. PATENT DOCUMENTS

| 3,556,458 | 1/1971 | Erith et al. | 410/83 |
| 3,612,466 | 10/1971 | Arnold | 410/83 |
| 3,682,423 | 8/1972 | Scarborough | 410/83 |
| 3,682,432 | 8/1972 | Lapaich | 410/83 |
| 3,825,294 | 7/1974 | Carr | 410/82 |
| 3,866,970 | 2/1975 | Schwiebert | 410/83 |

FOREIGN PATENT DOCUMENTS

| 1922758 | 11/1969 | Fed. Rep. of Germany | 410/82 |
| 1655583 | 12/1970 | Fed. Rep. of Germany | 410/83 |
| 2613465 | 10/1977 | Fed. Rep. of Germany | 410/82 |
| 1215643 | 12/1970 | United Kingdom | 410/83 |
| 1363279 | 8/1974 | United Kingdom | 410/82 |

Primary Examiner—Bruce H. Stoner, Jr.
Assistant Examiner—James E. Barlow
Attorney, Agent, or Firm—Christie, Parker & Hale

[57] ABSTRACT

A container locking device includes an oblong guiding element fixed on one end of the housing. A round passage extends through the housing from end to end and through the guiding element. A rotatable locking bolt lies in the passage, the locking bolt having a first end extending from the guiding element and a second end extending from the end of the housing opposite the guiding element. An oblong hammer head is fixed on the first end of the locking bolt. A handle is fixed on the second end of the locking bolt. Axial movement of the locking bolt is restrained. The result is a low-cost, reliable, safe container locking device. Stops limit rotation of the locking bolt to an excursion of approximately 90°. The passage is formed with a tube that extends outwardly from the end of the housing opposite the guiding element to space the handle therefrom and thereby facilitate its movement. A removable catch secures the handle in the position where the hammer head is transverse to the guiding element.

2 Claims, 5 Drawing Figures

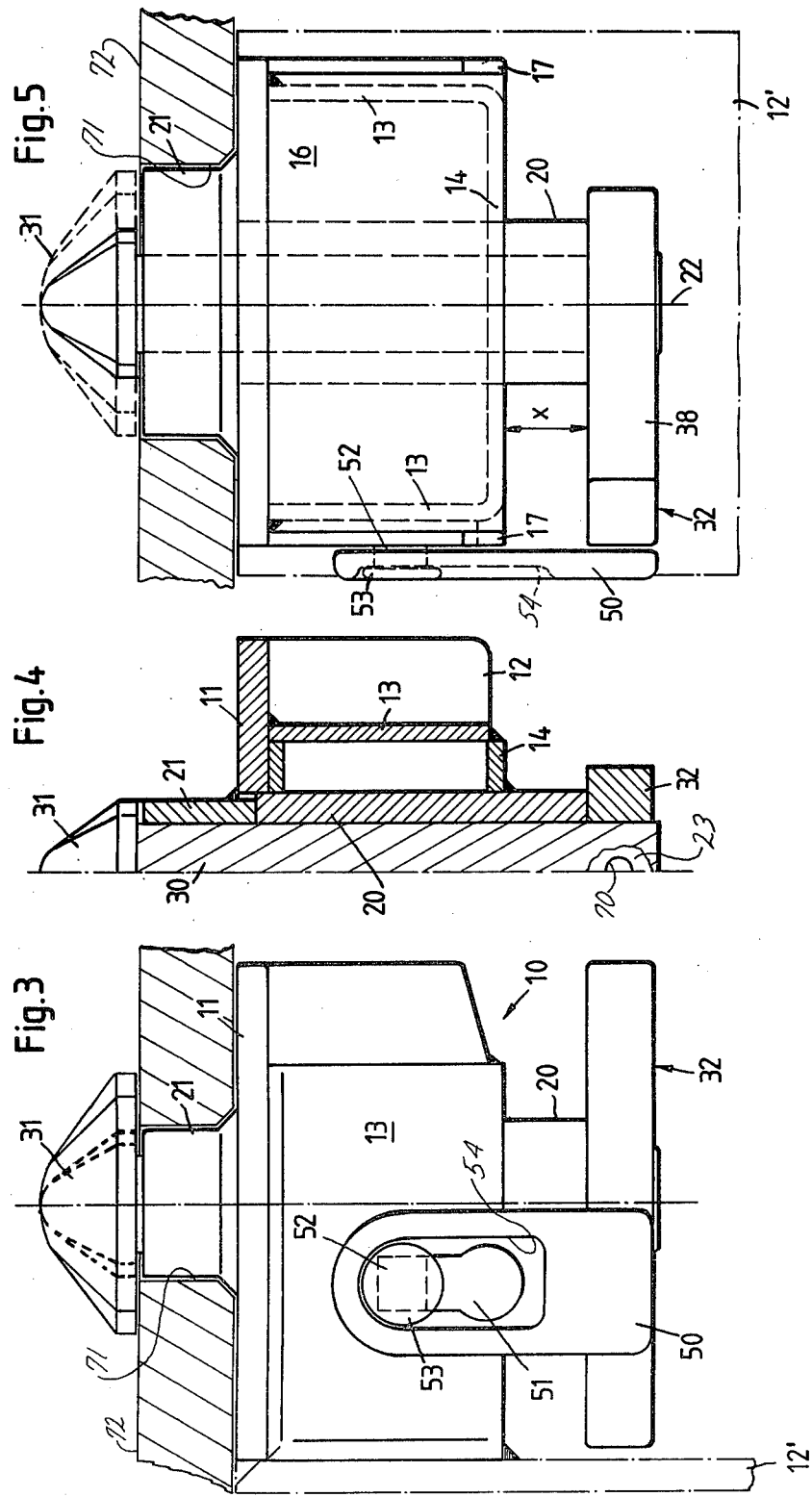

DEVICE FOR THE LOCKING CONTAINER ON VEHICLES

BACKGROUND OF THE INVENTION

The invention relates to a device for the locking container on a vehicle.

At the present time, the so-called low tension designs are most commonly used in locking containers on motor vehicles. In these designs, a hammer head is pulled axially against the surface of the plate with the aid of a tension screw. In traffic by rail and in long distance travel by truck, locking designs are nevertheless used, which for reasons of cost as well as reasons of ready service, do not possess this low tension capability. Many of the locking devices of this simple sort, presently in use, are of uncertain strength and reliability. Moreover, many of these well-known devices require varying types of beams on the vehicles and thus can be used by only certain vehicle manufacturers. Hence, attachment devices have been designed, which conform to "U"-shaped beams and which require additional bracing. Others are welded above, on the upper side of the beam, and overlap onto the sides. Still other designs, installed in box-shaped beams, require extensive slit-like modifications to the beam.

Against this background, the task of the invention became one of designing a locking device that is both more secure and more economical to produce, while at the same time bearing in mind its reliability and its relationship to safety.

SUMMARY OF THE INVENTION

According to the invention, a container locking device includes an oblong guiding element fixed on one end of the housing. A round passage extends through the housing from end to end and through the guiding element. A rotatable locking bolt lies in the passage, the locking bolt having a first end extending from the guiding element and a second end extending from the end of the housing opposite the guiding element. An oblong hammer head is fixed on the first end of the locking bolt. A handle is fixed on the second end of the locking bolt. Axial movement of the locking bolt is restrained. The result is a low-cost, reliable, safe container locking device.

A feature of the invention is stops for limiting rotation of the locking bolt to an excursion of approximately 90°.

Another feature of the invention is the formation of the passage with a tube that extends outwardly from the end of the housing opposite the guiding element to space the handle therefrom and thereby facilitate its movement.

Another feature of the invention is a removable catch for securing the handle in the position where the hammer head is transverse to the guiding element, i.e., the locking device is closed. Specifically, the catch interferes with the handle to prevent its rotation.

BRIEF DESCRIPTION OF THE DRAWINGS

The features of specific embodiments of the best mode contemplated of carrying out the invention are illustrated in the drawings, in which:

FIG. 3 is a side view of the device;

FIG. 4 is a cross section through the device, in reference to lines IV—IV in FIG. 1; and FIG. 5 is a view of the front surface of the device.

DETAILED DESCRIPTION OF THE SPECIFIC EMBODIMENTS

Figure 2:
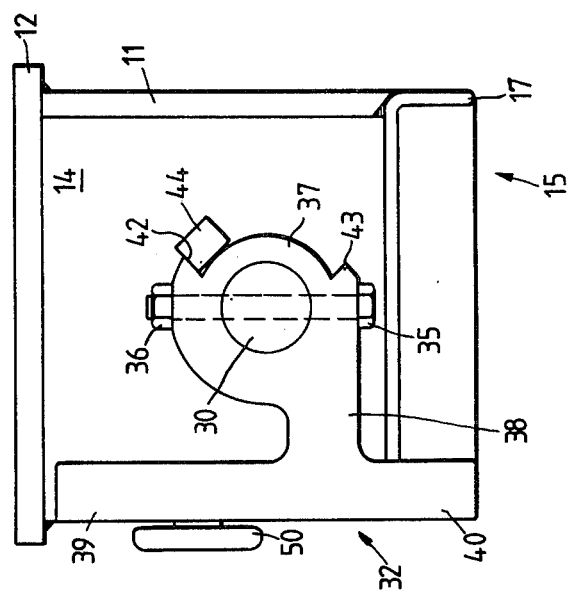
FIG. 2 is a view of the device from below.

The device for locking containers has a housing identified as a unit by the reference number 10, whose upper side is built upon the plate 11. A plurality of such devices would ordinarily be provided to lock a container. Plate 11 of each device would lie in the same plane. The container would rest on the plates of all the devices and be supported thereby. The back side of the device, which faces the vehicle not represented (for example to the left in FIG. 3), is formed by a mounting plate 12, as can be seen in the example according to FIG. 2. In all other embodiments, the mounting plate 12 is a component of the vehicle and is formed, for example, on one of the free ends of a support serving the device and from the projecting beam of the vehicle's frame. In this instance, the housing receives its closed form herein, that it is welded with the mounting plate 12 whose side is adjacent to the vehicle.

From the side, the housing is bounded by the side walls 13 and the bottom 14. The front face of the housing 10 forms a cross piece 16 of a "U"-profile 15, whose side 17 runs from the plate 11 all the way to the bottom 14, with a distance corresponding to the width of the plate 11 and ending at the front corner of the plate 11. The "U"-profile 15 encloses the space opening onto the front, as is well illustrated in FIGS. 1 and 2, and provides room for lamps, reflectors, etc.

The housing 10 is equipped with a rigid tube 20, which connects the plate 11 with the bottom 14 and projects below, beyond the bottom 14, to the specified degree of "x". The guiding element 21 is set on to the free upper surface of the plate 11. It is connected securely with the plate or is an integral part of the housing 11, if this is a cast section. This guiding element is oblong and approximately rectangular, in the usual fashion; its outline and its height conform to the normal size and normal cross section of the openings at a container's corners provided for mounting purposes. The guiding element receives the opening 71 in the corner mounting elements 72 of a container as it is mounted on plate 11 and carries the horizontal stress between the vehicle and the container 72.

The guiding element 21 is equipped with a round bore hole that follows the axis 22, as illustrated in FIG. 5. The axis 22 is at the same time the axis of the tube 20. In other words, the bore hole of element 21 is aligned with and has the same diameter as the round passage 23 through tube 20.

The guiding element 21 and the tube 20 are aligned with a locking bolt 30, which carries on its free upper end the typical hammer head 31 for the locking device. Hammer head 31 is oblong and approximately rectangular; it coincides in cross section with guiding element 21. On its lower end, it is connected with the operating handle 32. The connection between the operating handle 32 and the locking bolt 30 can either be welded (see FIGS. 3 or 5) or fastened with a screw 35 passing through a hole 70 in the middle thereof and secured with a nut 36 (compare FIGS. 2 or 4).

Figure 1:
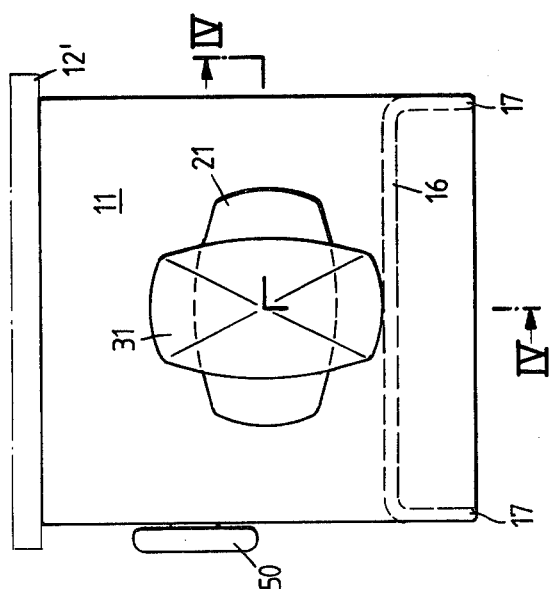
FIG. 1 is a view of a device for locking containers, as seen from above.

The operating handle 32, as illustrated in the view in FIG. 2, has the basic form of a "T" and features on the end turned toward the locking bolt 30 a ring 37 which serves as a connection to the locking bolt. From the ring 37 extends an arm 38, from which the gripping part 39 projects and from which, in turn, a lever 40 can project, as illustrated in all the examples. Through the form of the operating handle 32, as is especially well illustrated in FIG. 2, the gripping part 39 is sufficiently long for proper grasping, without requiring the operating handle 32 to go beyond the outline of the plate 11. As illustrated in FIGS. 1 and 2, the operating handle 32 stays within the working boundaries (corresponding to the locked position of the hammer head) and within the outline of the plate 11. In unfavorable instances, where a mounted container cannot be properly bolted, a tube can be pushed over the lever 40 and thereby create a functioning lever arm of the appropriately enlarged size.

In an example not represented, the operating handle 32 takes on the form of a "7", with the short cross bar forming the arm 38 and the downstroke of the "7" defining the gripping part. According to the desired size of the housing, an "L"-form for the operating handle 32 is possible.

The above mentioned dimension "x", needed to extend the tube 20 under the bottom 14, is so chosen that the gripping part 39 can be held by a large hand, without causing the danger of injury on the housing. The tube 20 keeps the operating handle 32 from moving upward along the axis 22. Downward motion is checked by the position of the hammer head 31 on the upper side of the guiding element 21.

The hammer head must be able, in a typical fashion, to be turned between a release position (the phantom lines in the drawing) and a locked position. The angle of turning is 90°. In the release position, hammer head 31 is aligned with the guiding element 21 so the mounting openings of the container are free to pass upwardly off of plate 11. In the closed position, hammer head 31 is transverse to guiding element 21, so the container is locked in place. The possible turning movement of the locking bolt with the hammer head must be limited accordingly. For this purpose, two stops 42 and 43 are provided on the ring 37 of the operating handle 32 symmetrical to the axis 22. These stops, in response to the movement of the operating handle, lie alternatingly against the one side of the other of a stop cam 44, which projects from the bottom 14 of the housing 10, below into the area of the ring 37, as well as being welded to the side of the tube 20, so that it projects parallel to and in the direction of axis 22 into the area of the stops 42 and 43.

To prohibit the hammer head 31 from moving out of its locked position (for example, FIG. 1), a catch has been designed. This corresponds with the catch 50 in the example, which is seen especially well in FIGS. 3 and 5. The catch is designed with a slit 51 comprising two parts, which, in FIG. 3, has parallel side walls in the upper part while the lower part is rounded. The catch 50 is fixed on the end of a square post 52, which projects from a side wall 13 of the housing 10, extends through the slit 51, and is covered on its free end with a disc 53. The disc 53 rides in a shallow recess 54 formed on the outer face of catch 50. The distance between the parallel sides of the slit 51 defines the size of the post 52. The diameter of the rounded out portion of the slit 51 defines the diagonal of the post 52. Therefore, the catch 50 cannot lower itself in a horizontal direction from the square, but instead can raise itself only along the slit 51 (the position shown in FIG. 3) and then turn in the rounded out portion. In the illustrated position, the catch 50 prohibits the movement of the operating handle 32 and with it the hammer head 31 because catch 50 interferes with rotation of gripping portion 39. The unfastening of the hammer head is therefore only possible when the catch is first raised.

Attached hereto as Appendix A and incorporated herein is a copy of the German application upon which priority is claimed. Appendix A is to be regarded as part of the original disclosure of this application for the purposes of 35 USC 112, first paragraph.

What is claimed is:

1. A container locking device comprising:
   a housing including a horizontal top portion and a horizontal bottom portion downwardly spaced from the top portion;
   an oblong guiding element fixed on the top of the housing, the guiding element having a round vertical passage extending through it;
   a vertical tube attached to the top and bottom portions of the housing, the top of the tube abutting the bottom of the guiding element in alignment with its passage and the bottom of the tube extending below the bottom portion of the housing;
   a rotatable locking bolt lying in the passage of the element and the tube, the locking bolt having a first end extending from the top of the guiding element and a second end extending from the bottom of the tube;
   means for limiting rotation of the locking bolt to an excursion of approximately 90°;
   an oblong hammer head fixed on the first end of the locking bolt, the hammer head coinciding in cross section with the guiding element;
   a handle fixed on the second end of the locking bolt, the bottom of the tube spacing the handle from the housing to facilitate gripping;
   a post having a rectangular cross section and a given diagonal dimension, the post extending from the housing transverse to the locking bolt; and
   a catch having a slot, the slot having an upper part with parallel sides adapted to receive the post with a close fit and a circular bottom having a diameter larger than the given diagonal dimension to permit clearance by the post, the handle having an elongated portion with which the catch interferes to prevent rotation of the locking bolt when the catch is in place with its upper part receiving the post.

2. The locking device of claim 1, in which the post has a retaining disc on its end and the catch has a recess aligned with the slot in which the disc rides as the post moves through the slot.

* * * * *